(12) United States Patent
Tamura et al.

(10) Patent No.: US 9,284,490 B2
(45) Date of Patent: Mar. 15, 2016

(54) ORGANIC/INORGANIC HYBRIDS, AND PROCESS OF PRODUCING THEM

(75) Inventors: Kenji Tamura, Tsukuba (JP); Kazuya Morimoto, Tsukuba (JP); Hirohisa Yamada, Tsukuba (JP)

(73) Assignee: NATIONAL INSTITUTE FOR MATERIALS SCIENCE, Tsukuba-Shi, Ibaraki (JP)

( * ) Notice: Subject to any disclaimer, the term of this patent is extended or adjusted under 35 U.S.C. 154(b) by 279 days.

(21) Appl. No.: 13/881,556

(22) PCT Filed: Oct. 13, 2011

(86) PCT No.: PCT/JP2011/073487
§ 371 (c)(1),
(2), (4) Date: Apr. 25, 2013

(87) PCT Pub. No.: WO2012/056888
PCT Pub. Date: May 3, 2012

(65) Prior Publication Data
US 2013/0221295 A1    Aug. 29, 2013

(30) Foreign Application Priority Data

Oct. 28, 2010  (JP) ................ 2010-242726

(51) Int. Cl.
| | |
|---|---|
| *C01G 49/02* | (2006.01) |
| *C09K 21/06* | (2006.01) |
| *C01B 13/14* | (2006.01) |
| *C01F 5/14* | (2006.01) |

(Continued)

(52) U.S. Cl.
CPC ............. *C09K 21/06* (2013.01); *C01B 13/14* (2013.01); *C01B 13/145* (2013.01); *C01F 5/14* (2013.01); *C01F 7/021* (2013.01); *C01F 11/02* (2013.01); *C01G 49/02* (2013.01); *C01P 2002/08* (2013.01); *C01P 2002/22* (2013.01); *C01P 2002/72* (2013.01); *C01P 2002/82* (2013.01)

(58) Field of Classification Search
CPC ................................................... C01G 49/02
See application file for complete search history.

(56) References Cited

FOREIGN PATENT DOCUMENTS

| JP | 3977724 B2 | 7/2003 |
|---|---|---|
| JP | 2004-091421 A | 3/2004 |
| JP | 2005-247682 A | 9/2005 |

(Continued)

OTHER PUBLICATIONS

PCT, "International Search Report for PCT/JP2011/073487", Dec. 6, 2011.

(Continued)

*Primary Examiner* — Peter F Godenschwager
(74) *Attorney, Agent, or Firm* — Manabu Kanesaka

(57) ABSTRACT

The invention has for its objects to provide an organic/inorganic hybrid that has high flame retardancy, flexibility, moldability and affinities for organic compounds, and is capable of including therein an organic compound having a large number of carbon atoms.

The organic/inorganic hybrid comprises a layered hydroxide mineral 40 with sheet-like inorganic compound unit layers 11a, 11b, 11c and 11d and an organic compound 13 included between the inorganic compound unit layers 11a, 11b, 11c and 11d. The above objects are achievable by using as the hydroxide mineral 40 at least one hydroxide mineral selected from the group consisting of $Mg(OH)_2$, $Ca(OH)_2$, $Al(OH)_3$, $AlO(OH)$, $Fe(OH)_3$ and $FeO(OH)$, and as the organic compound 13 a saccharide having 4 to 40 carbon atoms.

11 Claims, 9 Drawing Sheets

(51) Int. Cl.
  C01F 7/02     (2006.01)
  C01F 11/02    (2006.01)

(56) References Cited

FOREIGN PATENT DOCUMENTS

| JP | 2008-080313 A | 4/2008 |
|----|---------------|--------|
| WO | WO 2007/029376 A1 | 3/2007 |

OTHER PUBLICATIONS

Sumio Aisawa et al., "Synthesis of Functional Nanohybrids from Layered Double Hydroxides as a Host Material and Their Applications", Journal of the Society . . . , May 1, 2010.

Masashi Inoue et al., "Organic Derivatives of Layered Inorganics Having the Second Stage Structure" Chem. Mater., 9, 1614-1619 (1997).

Fernando Wypych et al., "Covalent Grafting of Ethylene Glycol and Glycerol into Brucite", J. Colloid. Interface. Sci., 253, 180-184 (2002).

Europe Patent Office, "Search Report for EP 11836027.0," Mar. 13, 2014.

Aisawa, Sumio et al., "Sugar-anionic clay composite materials: intercalation of pentoses in layered double hydroxide," Journal of Solid State Chemistry, Apr. 25, 2003, pp. 342-348, vol. 174, Academic Press.

Database WPI, "XP-002720871," Thomson Scientific, Mar. 25, 2004.

Wang, De-Yi et al., "Preparation and burning behaviors of flame retarding biodegradable poly (lactic acid) nanocomposite based on zinc aluminum layered double hydroxide," Polymer Degradation and Stability, Dec. 1, 2010, pp. 2474-2480, vol. 95, No. 12, Elsevier Ltd.

ORGANIC/INORGANIC HYBRIDS, AND PROCESS OF PRODUCING THEM

RELATED APPLICATIONS

The present application is National Phase of International Application No. PCT/JP2011/073487 filed Oct. 13, 2011, and claims priority from Japanese Application No. 2010-242726, filed Oct. 28, 2010.

BACKGROUND OF THE INVENTION

1. Art Field

The present invention relates to organic/inorganic hybrids, and a process of producing them.

2. Background Art

Hydroxide minerals represented by brucite, portlandite, gibbsite, boehmite, lepidocrocite, etc. are ubiquitous substances that occur abundantly in the surface layer of the earth.

Hydroxide minerals have a variety of features inclusive of absorption capability, catalytic activity, and harmless to the human body (free from antigen-antibody reactions). For this reason, they have been used in a variety of fields in the form of purification adsorbents for water and waste oils, catalysts for petroleum cracking, agents form removal of sulfur oxides from thermal power plant emissions, counteragents for acidified rivers and soils, pharmaceutical raw materials, flame retarders for plastics, and so on.

Now they attract attention as pharmaceutical raw materials and retarders in particular.

For instance, Patent Publication 1 discloses pharmaceutical raw materials harnessing hydroxide minerals excelling in antacid capability, and Patent Publication 2 discloses materials for drug delivery systems (DDS for short) making use of hydroxide minerals. Note here that DDS is a technology for quantitative, spatial and time control of the distribution of biomolecules and drugs injected into the living body.

A typical hydroxide mineral is a multilayered structure having as a basic structure unit layers wherein octahedrons having $OH^-$ or $O^{2-}$ hexacoordinating to a metal such as $Mg^{2+}$, $Ca^{2+}$, $Al^{3+}$, and $Fe^{3+}$ are lined up through edge sharing in a planar configuration. If an organic compound is inserted between the unit layers, its affinity for that organic compound could grow high.

In practical applications of inorganic compounds having a laminated structure like clay minerals, layered titanates, chalcogen compounds, and aluminum-magnesium composite hydroxides (hereinafter called hydrotalcite), an organic compound is inserted between the unit layers instead of interlayer ions (hereinafter also called exchangeable ions) to form a structure (hereinafter called the organic/inorganic hybrid) where the organic compound is hybridized with the inorganic compound in a nanoarea (hereinafter called the nanohybridization). Especially in the development of DDS going deep into the nanoarea, there is an organic/inorganic hybrid formed in which biomolecules or drugs having exchangeable ions are included (or intercalated) between the unit layers.

Non-Patent Publications 1 and 2 show organic/inorganic hybrids prepared by high-temperature treatment of glycols having two carbon atoms or glycerols having three carbon atoms, all being sugar alcohols that are liquid at room temperature.

However, the unit layers of the hydroxide mineral is electrically neutral, and do not have any interlayer ions for neutralizing their charges, with the adjacent planes of the unit layers being strongly bonded to each other by way of hydrogen bonds. It is still difficult to include the organic compound in a narrow space between the unit layers.

There is also still no effective method of cutting hydrogen bonds by way of which the unit layers are bonded together, and it is still impossible to include the organic molecules between the unit layers either.

With the possibility of using hydroxide minerals as DDS materials in consideration, many organic compounds having medication efficacies have a large number of carbon atoms, and it is still difficult to include an organic compound having a lot of carbon atoms in a narrow space between the unit layers.

There has also been difficulty achieving a material that has a sustained release feature good enough to release the included organic compound slowly in constant amounts over the elapse of constant times.

In addition, the aforesaid hydrotalcite contains aluminum, and as it is used as the DDS material, there is a risk of inducing aluminum-associated encephalosis or the like.

It has also been known in the art that hydroxide minerals are usable as flame retarders for plastics.

For instance, brucite and gibbsite dehydrate and decompose drastically at 200 to 400° C., causing an endothermic reaction. With gibbsite, an endothermic reaction of about 1.5 kJ/g keeps going on, and with brucite, an endothermic reaction of 1.39 kJ/g keeps going on. An exothermic reaction of polyethylene is 43.4 kJ per gram. If polyethylene is blended with 66% by mass of gibbsite, the generation of heat by burning is almost leveled with the absorption of heat by the decomposition of gibbsite, resulting in a lowering of the temperature of a burning reaction field, which prevents burning from going on. Hydroxide minerals hinder a burning reaction of plastics, keeps temperature against rising upon burning of plastics, have a self-extinguishing feature, and facilitate prevention of smoking. Furthermore, brucite and gibbsite do not give rise to dioxin or other toxic gases upon burning; they are used as eco-friendly non-halogen flame retarders.

Upon high-density packaging of hydroxide minerals in high molecules such as polyethylene, however, there is a risk of being noticeably detrimental to flexibility and moldability, which offers a grave practical challenging problem.

If an inorganic compound is pulverized down to a nanometer level for dispersion throughout a plastic or rubber component, it is then possible to obtain a nanocomposite material having high flame retardancy. The finely pulverized inorganic compound forms a carbide film called a char on a burning surface, which keeps oxygen against being fed under burning reactions, producing a flame retarding effect.

Even though hydrophilic hydroxide minerals are hybridized into high molecules as they stand, however, it is much detrimental to dispersibility, encountering difficulty obtaining flame retarding features through fine dispersion.

LISTING OF THE PRIOR ART

Patent Publications

Patent Publication 1: U.S. Pat. No. 3,977,724
Patent Publication 2: WO2007-029376

Non-Patent Publications

Non-Patent Publication 1:
M. Inoue, H. Kominami, Y. Kondo, T. Inui, "Organic Derivatives of Layered Inorganics Having the Second Stage Structure" Chem. Mater., 9, 1614-1619 (1997)

Non-Patent Publication 2:

F. Wypych, W. H. Schreiner, R. Marangoni, "Covalent Grafting of Ethylene Glycol and Glycerol into Brucite", J. Colloid. Interface. Sci., 253, 180-184 (2002)

SUMMARY OF THE INVENTION

Objects of the Invention

The invention has for its objects to provide an organic/inorganic hybrid that has high flame retardancy, flexibility, moldability and affinities for organic compounds, and is capable of including therein an organic compound having a large number of carbon atoms, and a process of producing the same.

Embodiments of the Invention

The inventors have found out that a saccharide having four or more carbon atoms can be included between the unit layers of an electrically neutral organic compound layer, accomplishing the invention disclosed herein.

That is, the invention disclosed herein is embodied as the following (1) to (10).

(1) An organic/inorganic hybrid, comprising a layered hydroxide mineral with sheet-like inorganic compound unit layers, and an organic compound included between said inorganic compound unit layers, characterized in that each of said inorganic compound unit layers is electrically neutral and has a hydroxyl group on its surface, said hydroxide mineral is at least one hydroxide mineral selected from the group consisting of $Mg(OH)_2$, $Ca(OH)_2$, $Al(OH)_3$, $AlO(OH)$, $Fe(OH)_3$ and $FeO(OH)$, and said organic compound is a saccharide having 4 to 40 carbon atoms.

(2) The organic/inorganic hybrid as recited in (1), characterized in that said hydroxide mineral is one hydroxide mineral selected from the group consisting of brucite, portlandite, gibbsite, boehmite, nordstrandite, doyleite, bialite, bernalite, and lepidocrocite.

(3) The organic/inorganic hybrid as recited in (1), characterized in that hydrogen bonds between said hydroxyl groups between adjacent said inorganic compound unit layers are cut.

(4) The organic/inorganic hybrid as recited in (3), characterized in that a part of said hydrogen bonds between said hydroxyl groups remains uncut.

(5) The organic/inorganic hybrid as recited in any one of (1) to (4), characterized in that each of said inorganic compound unit layers has octahedrons lined up through edge sharing in a sheet configuration, wherein each octahedron has $OH^-$ or $O^{2-}$ ions hexacoordinating to any one metal ion of $Mg^{2+}$, $Ca^{2+}$, $Al^{3+}$ or $Fe^{3+}$.

(6) The organic/inorganic hybrid as recited in any one of (1) to (5), characterized in that said saccharide having 4 to 40 carbon atoms is at least one saccharide selected from the group consisting of a sugar alcohol, a sugar, and a derivative thereof.

(7) The organic/inorganic hybrid as recited in (6), characterized in that said sugar alcohol is at least one sugar alcohol selected from the group consisting of erythritol, threitol, arabinitol, xylitol, ribitol, iditol, galactitol, sorbitol, mannitol, volemitol, perseitol, and D-erythro-D-galacto-octitol.

(8) The organic/inorganic hybrid as recited in (6), characterized in that said sugar is at least one sugar selected from the group consisting of glucose, fructose, galactose, mannose, maltose, sucrose, lactose, fructo-oligosaccharide, galacto-oligosaccharide, raffinose, stachyose, starch, glycogen, cellulose, pectin, alginic acid, glucomannan, chitin, hyaluronic acid, chondoroitin, and agarose.

(9) A process of producing the organic/inorganic hybrid as recited in any one of (1) to (8), characterized by comprising a step of mixing said hydroxide mineral with said saccharide having 4 to 40 carbon atoms to form a mixture, and a step of melting said mixture to cut hydrogen bonds between adjacent said inorganic compound unit layers.

(10) The process of producing the organic/inorganic hybrid as recited in (9), characterized in that said mixture is molten in a temperature range that is below the thermal decomposition temperature of said saccharide having 4 to 40 carbon atoms and higher than 150° C.

Advantages of the Invention

The invention disclosed here provides an organic/inorganic hybrid comprising a hydroxide mineral with sheet-like inorganic compound unit layers lined up and laminated one upon another and an organic compound included between said inorganic compound unit layers, wherein said hydroxide mineral is at least one hydroxide mineral selected from the group consisting of $Mg(OH)_2$, $Ca(OH)_2$, $Al(OH)_3$, $AlO(OH)$, $Fe(OH)_3$ and $FeO(OH)$, and said organic compound is a saccharide having 4 to 40 carbon atoms. Thus, the inventive organic/inorganic hybrid provides a material that combines the high flame retardancy inherent in the hydroxide mineral with the high flexibility and moldability inherent in the saccharide having 4 to 40 carbon atoms, and that may be used as a flame retardant by itself. That material has an affinity for organic compounds, and may easily be mixed with plastics for possible applications to nanocomposite or nanohybrid materials having high flame retardancy. To add to this, an organic compound having a high affinity for saccharides may be held in gaps between saccharides between the unit layers of the hydroxide mineral, and there is a sustained release material obtained as well. This may allow the inventive organic/inorganic hybrid to be applied to substance delivery materials.

The invention disclosed herein also provides a process of producing the aforesaid organic/inorganic hybrid, comprising the step of mixing the hydroxide mineral with the saccharide having 4 to 40 carbon atoms, and the step of melting said mixture. This enables hydrogen bonds via which the unit layers of the hydroxide mineral are firmly bonded together to be cut to make spaces between said unit layers so wide that there can be an organic/inorganic hybrid easily produced, comprising a hydroxide mineral with sheet-like inorganic compound unit layers lined up and laminated one upon another and an organic compound included between said inorganic compound unit layers.

BRIEF DESCRIPTION OF THE DRAWINGS

FIG. 1 is illustrative in schematic of one example of the inventive organic/inorganic hybrid.

MODE FOR CARRYING OUT THE INVENTION

Embodiments of the Invention

The organic/inorganic hybrids according to some embodiments of the invention will now be explained with reference to the accompanying drawings.

FIG. 1 is illustrative in schematic of the organic/inorganic hybrid according to one embodiment of the invention.

Figure 1A:
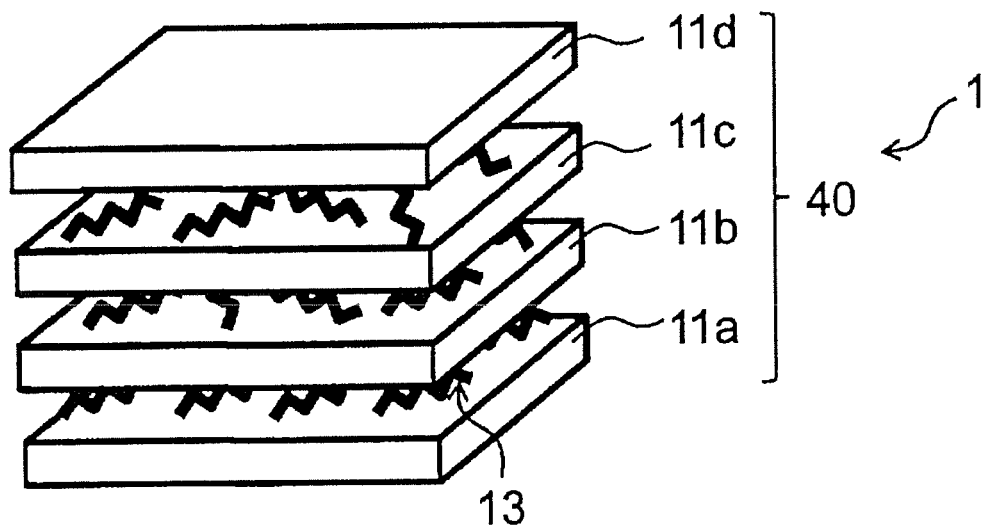
FIG. 1(a) is a perspective view and FIG. 1(b) is a side view.

As depicted in FIG. 1(a), an organic/inorganic hybrid 1 according to one embodiment of the invention is a structure comprising an organic compound and an inorganic compound. That structure is generally made up of a layered hydroxide mineral 40 with sheet-like inorganic compound unit layers 11a, 11b, 11c and 11d, and an organic compound 13 inserted between the inorganic compound unit layers 11a, 11b, 11c and 11d.

While four inorganic compound unit layers 11a, 11b, 11c and 11d are shown to be laminated one upon another in FIG. 1(a), it is to be understood that there is no specific limitation on how many layers are laminated one upon another; two or more such layers may be laminated together because the organic compound 13 may be inserted between them.

The hydroxide mineral 40 used herein is at least one hydroxide mineral selected from the group consisting of magnesium hydroxide Mg(OH) (brucite), calcium hydroxide Ca(OH)$_2$ (portlandite), aluminum hydroxides represented by γ-Al(OH)$_3$ (gibbsite), γ-AlO(OH) (boehmite), β-Al(OH)$_3$ (nordstrandite), δ-Al(OH)$_3$ (doyleite) and α-Al(OH)$_3$ (bialite), and ferric hydroxides represented by Fe(OH)$_3$ (bernalite) and γ-FeO (lepidocrocite), among which brucite, gibbsite, boehmite and portlandite are more preferred. These materials are composed of ions of metals: magnesium, calcium, aluminum, and iron, and the inorganic compound unit layers 11a, 11b, 11c and 11d are bonded together by way of hydrogen bonds into a crystal structure that makes it possible to produce an organic/inorganic hybrid having high stability.

The hydroxide mineral 40 may be either a naturally occurring one or a man-made synthetic one. Synthesis processes, for instance, may rely on alkali-neutralization reactions at relatively low temperatures, precipitation from oversaturated solutions, and hydrolysis of metal alkoxides.

Figure 1B:
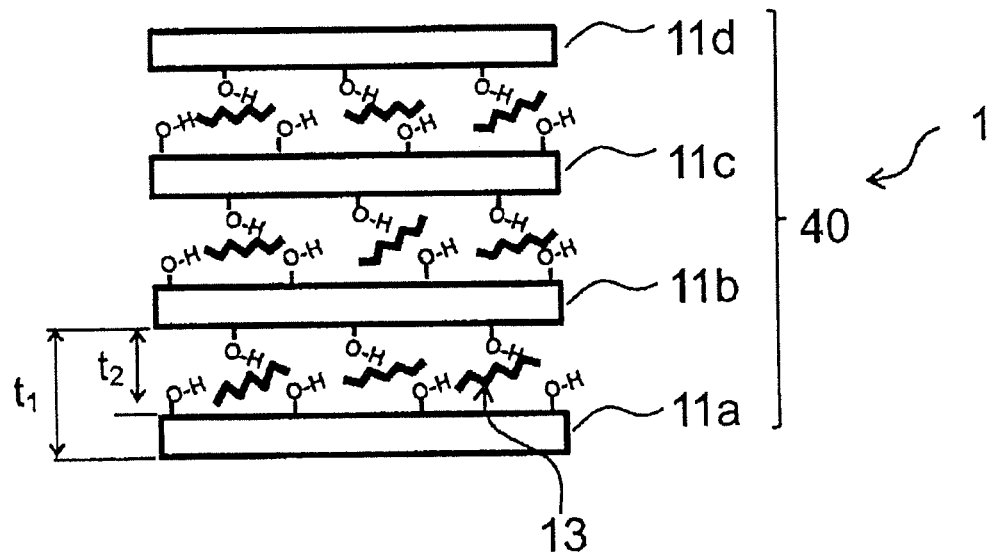

FIG. 1(b) is a side view of the organic/inorganic hybrid 1 shown in FIG. 1(a).

As depicted in FIG. 1(b), there are none of hydrogen bonds formed between the OH groups of the adjacent inorganic compound unit layers 11a, 11b, 11c and 11d, and instead there is the organic compound 13 included between the inorganic compound unit layers 11a, 11b, 11c and 11d.

While, in the organic/inorganic hybrid 1 shown in FIG. 1, all hydrogen bonds between the inorganic compound unit layers are cut, it is to be understood that a part of the hydrogen bonds may remain uncut.

It is also to be understood that the distance between the adjacent planes of the inorganic compound unit layers 11a and 11b is defined by $t_2$, and the base-to-base distance of the inorganic compound unit layers 11a and 11b is defined by $t_1$.

The inorganic compound unit layer 11a, 11b, 11c, 11d is in a sheet configuration in which the inorganic compounds are lined up.

Preferably, the inorganic compound is at least one hydroxide mineral selected from the group consisting of Mg(OH)$_2$, Ca(OH)$_2$, Al(OH)$_3$, AlO(OH), Fe(OH)$_3$ and FeO(OH).

Figure 2:
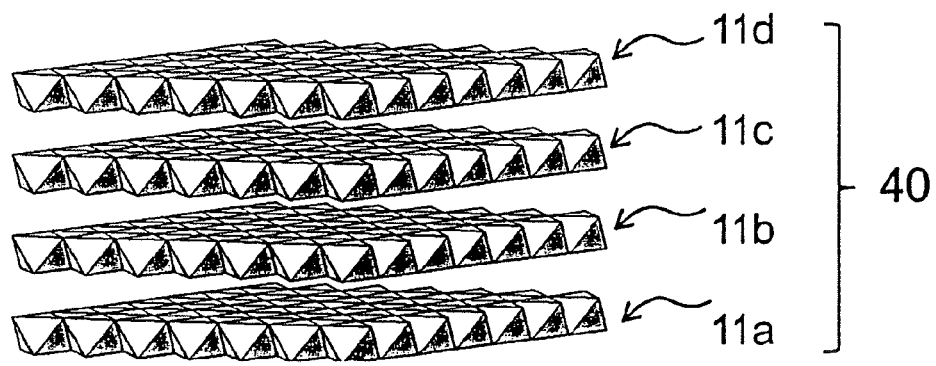
FIG. 2 is illustrative in perspective of one example of the inorganic compound unit layers.

FIG. 2 is a perspective view of one example of the inorganic compound unit layers: it is illustrative of one example wherein brucite, portlandite or the like is used as the hydroxide mineral.

Figure 3:
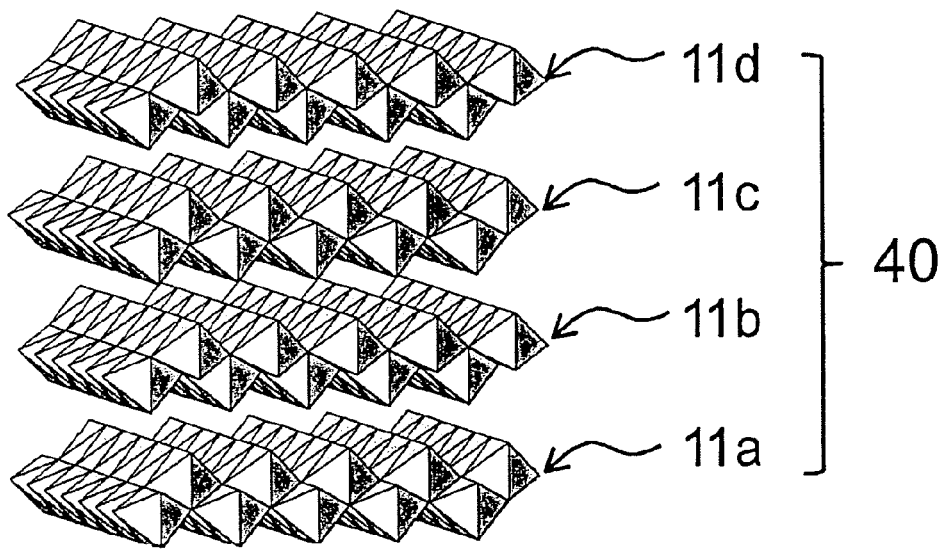
FIG. 3 is illustrative in perspective of another example of the inorganic compound unit layers.

FIG. 3 is a perspective view of another example of the inorganic compound unit layers: it is illustrative of one example wherein boehmite, lepidocrocite or the like is used as the hydroxide mineral.

An octahedron that provides a component unit of the inorganic compound unit layer 11a depicted in FIGS. 2 and 3 has any one metal ion of $Mg^{2+}$, $Ca^{2+}$, $Al^{3+}$ or $Fe^{3+}$ at its center, with a $OH^-$ ion or $O^{2-}$ ion coordinating to each apex.

As shown in FIGS. 2 and 3, the inorganic compound unit layer 11a should preferably be such that octahedrons having $OH^-$ ions or $O^{2-}$ ions hexacoordinating to at least one metal ion of $Mg^{2+}$, $Ca^{2+}$, $Al^{3+}$ or $Fe^{3+}$ are lined up through edge sharing in a sheet configuration. This is because there can be stable inorganic compound unit layer obtained.

The inorganic compound unit layer 11a, 11b, 11c, 11d should preferably be electrically neutral, and have a lot of hydroxyl groups on its surface. In the presence of layer charges, there must be exchangeable ions between the unit layers so as to neutralize them. When there are exchangeable ions, it will be difficult to include an organic compound between the unit layers unless it is an ionic one that forms pairs with them. According to the invention, hydroxyl groups on the surface of the unit layer have a strong affinity for a sugar and/or a sugar alcohol having 4 to 40 carbon atoms, making sure the formation of a stable inclusion compound.

The organic compound 13 should preferably be a saccharide having 4 to 40 carbon atoms. A saccharide having less than 4 carbon atoms, because of having an insufficient affinity for high molecules, will encounter difficulty achieving fine dispersion, resulting in the inability to allow for sufficient improvements in flame retardancy and mechanical properties. A saccharide having more than 40 carbon atoms, because of being too large in molecular size, will encounter difficulty being included between the inorganic compound unit layers of the hydroxide mineral.

Use of the saccharide having 4 to 40 carbon atoms allows the organic/inorganic hybrid 1 that is one embodiment of the invention to have high flexibility and high moldability, and be used as a flame retarder by itself. It is also possible to modify that hybrid 1 into a material that enables the fine inorganic compound unit layers to be easily dispersed in plastics. This may have applications to a nanocomposite or nanohybrid material having improved flame retardancy. In addition, it is possible to retain an organic compound having a high affinity for the saccharide 13 and usable as a drug formulation in gaps between the saccharides between the inorganic compound unit layers 11a, 11b, 11c and 11d, and modify that drug formulation into a material having sustained release features as good as making sure sustained release of small amounts over the elapse of constant times. This may be applied to DDS materials.

The saccharides having more than 4 carbon atoms, for instance, include sugar alcohols, and sugars or derivatives of them.

The sugar alcohols used herein should preferably be at least one selected from the group consisting of erythritol, threitol, arabinitol, xylitol, ribitol, iditol, galactitol, sorbitol, mannitol, volemitol, perseitol, and D-erythro-D-galacto-octitol.

The sugars used herein should preferably be at least one selected from the group consisting of glucose, fructose, galactose, mannose, maltose, sucrose, lactose, fructo-oligosaccharide, galacto-oligosaccharide, raffinose, galactose, stachyose, starch, glycogen, cellulose, pectin, alginic acid, glucomannan, chitin, hyaluronic acid, chondoroitin, and agarose.

It is here to be noted that just only a saccharide but also two or more saccharides may be included between the inorganic compound unit layers. This may help optimize the properties of the organic/inorganic hybrid.

The process of producing the inorganic/organic hybrid that is one embodiment of the invention will now be explained.

The process of producing the inorganic/organic hybrid that is one embodiment of the invention is what is called a mixing/melting process. More specifically, the invention provides a process of producing the organic/inorganic hybrid 1, comprising a step of mixing together the hydroxide mineral and the saccharide(s) having 4 to 40 carbon atoms to form a mixture (hereinafter referred to as the mixture-formation step) and a step of melting that mixture (hereinafter referred to as the melting step).

(Mixture-Formation Step)

First of all, given amounts of the hydroxide mineral and the saccharide(s) having 4 to 40 carbon atoms are provided and mixed together to form a mixture. If the hydroxide mineral is in a pulverized state, it is then possible to form a mixture at a uniform mixing ratio. It is here important to bring the hydroxide mineral in contact with the saccharide(s) having 4 to 40 carbon atoms over as many areas as possible.

Figure 4:
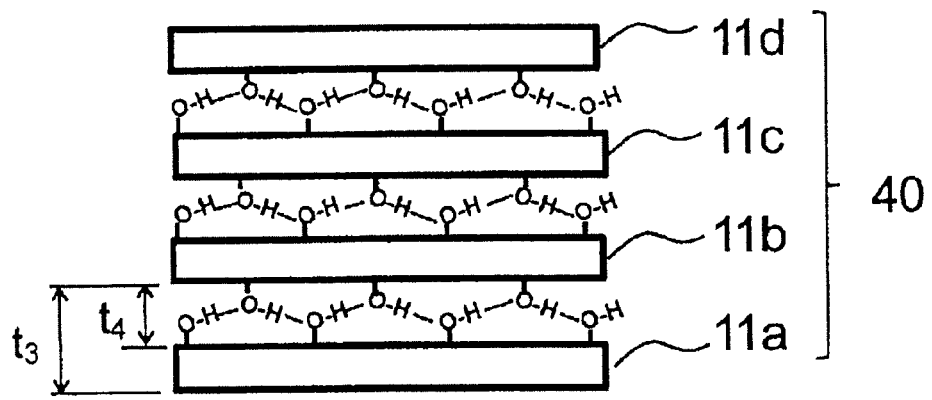
FIG. 4 is a side schematic of one example of the hydroxide mineral.

FIG. 4 is a schematic side view of one example of the hydroxide mineral 40. As depicted, the inorganic compound unit layers 11a, 11b, 11c and 11d are laminated one upon another, and firmly bonded to each other via hydrogen bonds between OH groups.

(Melting Step)

Then, the mixture is placed in a reactor controllable in terms of temperature and stirring.

Subsequently, the mixture is molten in a temperature range that is below the thermal decomposition temperature of the saccharide and higher than 150° C. The melting time is set at 24 hours as an example. It is thus possible to easily produce the organic/inorganic hybrid 1 depicted in FIG. 1.

It is here to be noted that after the reaction, the reaction product may be washed with an organic solvent such as methanol, filtered, and dried. This enables impurities to be removed to make the purity of the organic/inorganic hybrid 1 high.

The mixture melting process of the invention may be carried out such that after the mixing of the components, the mixture is melted and kneaded. It is thus possible for the organic compound to be more uniformly included between the inorganic compound unit layers of the hydroxide mineral. Melt kneading, for instance, may be done in a continuous or batch mode by known heating/kneading processes such as those using a Banbury mixer, a Brabender, a kneader, a roll, a uniaxial or multiaxial extruder, and a co-kneader.

The mixture should preferably be molten in a temperature range that is below the thermal decomposition temperature of the saccharide(s) and higher than 150° C.

When the mixture is molten at a temperature below 150° C., some hydrogen bonds between the inorganic compound unit layers remain uncut with the result that a sufficient amount of the organic compound will not be included. When the mixture is molten at a temperature higher than the thermal decomposition temperature of the saccharide(s) having 4 to 40 carbon atoms, conversely, thermal degradation of the sugar or sugar alcohol keeps going on excessively by long-term melting and mixing, resulting in a failure in the preparation of a uniform organic/inorganic hybrid.

The distance $t_4$ between the adjacent planes of the inorganic compound unit layers 11a and 11b of the hydroxide mineral 40 before formed into the organic/inorganic hybrid is narrower than the distance $t_2$ between the adjacent planes of the inorganic compound unit layers 11a and 11b after formed into the organic/inorganic hybrid, and the base-to-base distance $t_3$ of the inorganic compound unit layers 11a and 11b of the hydroxide mineral 40 before formed into the organic/inorganic hybrid is narrower than the base-to base distance $t_1$ of the inorganic compound unit layers 11a and 11b of the hydroxide mineral 40 after formed into the organic/inorganic hybrid.

By use of the process of producing the organic/inorganic hybrid that is one embodiment of the invention, however, it is possible to cut the hydrogen bonds via which the inorganic compound unit layers are bonded together and extend the distance between the adjacent planes and the base-to-base distance thereby including between the unit layers the organic compound that is the saccharide(s) having 4 to 40 carbon atoms.

Although, in order to include an organic compound in a hydroxide mineral, there has generally been a solvent method used in which a powdery, solid saccharide is dissolved in a good solvent for reactions with the hydroxide mineral, yet it is impossible to efficiently cut the hydrogen bonds between the inorganic compound unit layers, resulting in a failure in including a sufficient amount of the organic compound in the hydroxide mineral. In other words, it is impossible to produce the organic/inorganic hybrid 1 that is one embodiment of the invention.

The organic/inorganic hybrid 1 that is one embodiment of the invention comprises the layered hydroxide mineral 40 with sheet-like inorganic compound unit layers 11a, 11b, 11c and 11d and the organic compound 13 included between the inorganic compound unit layers 11a, 11b, 11c and 11d, wherein the hydroxide mineral is at least one selected from the group consisting of $Mg(OH)_2$, $Ca(OH)_2$, $Al(OH)_3$, $AlO(OH)$, $Fe(OH)_3$ and $FeO(OH)$, and the organic compound is a saccharide having 4 to 40 carbon atoms. It is thus possible to achieve a material that combines the high flame retardancy of the hydroxide mineral with the high flexibility and moldability of the saccharide having 4 to 40 carbon atoms, and that may be used as a flame retarder by itself. According to the invention, it is further possible to provide a material that may have applications to a nanocomposite or nanohybrid material of high flame retardancy that has an affinity for organic compounds, and may easily be mixed with plastics. Furthermore, it is possible to obtain a material that may retain organic compounds having a high affinity for saccharides in gaps between the saccharides between the unit layers of the hydroxide mineral and has sustained release features. That sustained releasing material may then be applied to substance delivery materials.

Especially if the organic/inorganic hybrid that is one embodiment of the invention is modified such that there is none of aluminum contained, for instance, into an organic compound/brucite ($Mg(OH)_2$) hybrid, it provides a DDS material having no risk of inducing aluminum-associated encephalosis.

In the organic/inorganic hybrid 1 that is one embodiment of the invention, the hydroxide mineral 40 is at least one hydroxide mineral selected from the group consisting of brucite, portlandite, gibbsite, boehmite, nordstrandite, doyleite, bialite, bernalite, and lepidocrocite. It is thus possible to produce an organic/inorganic hybrid of high stability that has a stable layer structure.

In the organic/inorganic hybrid 1 that is one embodiment of the invention, the inorganic compound unit layer 11a, 11b, 11c, and 11d is electrically neutral, and has a lot of hydroxyl groups on its surface. It is thus possible to include the sugar alcohols and/or sugars having 4 to 40 carbon atoms in it.

In the organic/inorganic hybrid 1 that is one embodiment of the invention, the inorganic compound unit layer 11a, 11b, 11c, 11d is such that octahedrons having $OH^-$ ion or $O^{2-}$ ions hexacoorinating to at least one metal ion of $Mg^{2+}$, $Ca^{2+}$, $Al^{3+}$ or $Fe^{3+}$ are lined up through edge sharing in a sheet configuration. It is thus possible to obtain stable inorganic compound unit layers thereby improving the stability of the organic/inorganic hybrid 1.

In the organic/inorganic hybrid 1 that is one embodiment of the invention, the saccharide 13 having 4 to 40 carbon atoms is a sugar alcohol, a sugar or a derivative thereof. This allows the organic/inorganic hybrid 1 to have high flexibility and moldability, and be used as a flame retarder by itself. If that hybrid has a high affinity for organic compounds, it may provide a material that can easily, finely be dispersed in plastics to form a composite material. This may lead to a nanocomposite or nanohybrid material having high flame retardancy. In addition, it is possible to retain an organic compound having a high affinity for the saccharide 13 and usable as a drug formulation in gaps between the saccharides between the inorganic compound unit layers 11a, 11b, 11c and 11d, and modify that drug formulation into a material having sustained release features as good as making sure sustained release of small amounts over the elapse of constant times. This hybrid may be applied to DDS materials.

In the organic/inorganic hybrid 1 that is one embodiment of the invention, the sugar alcohol is at least one sugar alcohol selected from the group consisting of erythritol, threitol, arabinitol, xylitol, ribitol, iditol, galactitol, sorbitol, mannitol, volemitol, perseitol, and D-erythro-D-galacto-octitol. Having high flame retardancy, flexibility, moldability and affinities for organic compounds, that organic/inorganic hybrid 1 can include therein an organic compound having a lot of carbon atoms.

In the organic/inorganic hybrid 1 that is one embodiment of the invention, the sugar is at least one sugar selected from the group consisting of glucose, fructose, mannose, maltose, sucrose, lactose, fructo-oligosaccharide, galacto-oligosaccharide, raffinose, galactose, stachyose, starch, glycogen, cellulose, pectin, alginic acid, glucomannan, chitin, hyaluronic acid, chondoroitin, and agarose. Having high flame retardancy, flexibility, moldability and affinities for organic compounds, that organic/inorganic hybrid 1 can include therein an organic compound having a lot of carbon atoms.

The process of producing the organic/inorganic hybrid 1 that is one embodiment of the invention comprises a step of mixing the hydroxide mineral 40 with the saccharide(s) 13 having 4 to 40 carbon atoms to form a mixture, and a step of melting said mixture. With this process, the hydrogen bonds via which the inorganic compound unit layers of the hydroxide mineral 40 are firmly bonded together are cut to make the interlayer space so wide that the saccharide(s) 13 can be included therein. It is thus possible to easily produce an organic/inorganic hybrid comprising an inorganic compound layer having inorganic compound unit layers lined up in a sheet configuration and an organic compound included between the laminated inorganic compound unit layers.

According to the process of producing the organic/inorganic hybrid 1 that is one embodiment of the invention wherein the mixture is molten in a temperature range that is below the thermal decomposition temperature of the saccharide(s) and higher than 150° C., the interlayer hydrogen bonds of the inorganic compound unit layers can sufficiently be cut to include a sufficient amount of the organic compound therein. Even though melting/mixing is carried out for an extended period of time, there is no risk of accelerating thermal degradation of sugar(s) and sugar alcohol(s), which makes sure the preparation of a homogeneous organic/inorganic hybrid.

In the process of producing the organic/inorganic hybrid 1 that is one embodiment of the invention, the saccharide(s) having 4 to 40 carbon atoms is any one of a sugar alcohol, a sugar or a derivative thereof. With that saccharide having high flame retardancy, flexibility, moldability and affinities for organic compounds, it is possible to easily produce an organic/inorganic hybrid that can include therein an organic compound having a lot of carbon atoms.

The organic/inorganic hybrid that is one embodiment of the invention is not limited to what has been described above: it may be modified in various ways within the scope of the technical concept of the invention. By way of illustration but not by way of limitation, some specific examples of one embodiment of the invention will now be given just below.

EXAMPLES

Example 1

For estimation of hydroxide mineral/sugar hybrid samples before and after preparation, base reflection changes were examined by means of an X-ray diffractometer (Cu-Kα rays) (ULTIMA-IV made by Rigaku Co., Ltd.)

At the same time, spectral changes in the hydrogen bonds between the unit layers of the hydroxide mineral were investigated by the ATR method using a Fourier transform infrared absorption detector (IRAffinity made by Shimadzu Corporation).

One gram of brucite (Rare Metallic Co., Ltd.) as the hydroxide mineral was mixed with 10 grams of D-sorbitol (made by Nakalai Tesque Inc.), and the mixture was placed in a reactor controllable in terms of temperature and stirring (Chemist Plaza made by Shibata Scientific Technology Ltd.). The mixing/melting conditions were 180° C. and 24 hours. After reaction, the reaction product was washed with methanol, filtered, and dried to prepare hydroxide mineral/sugar alcohol hybrid powders.

Figure 5:
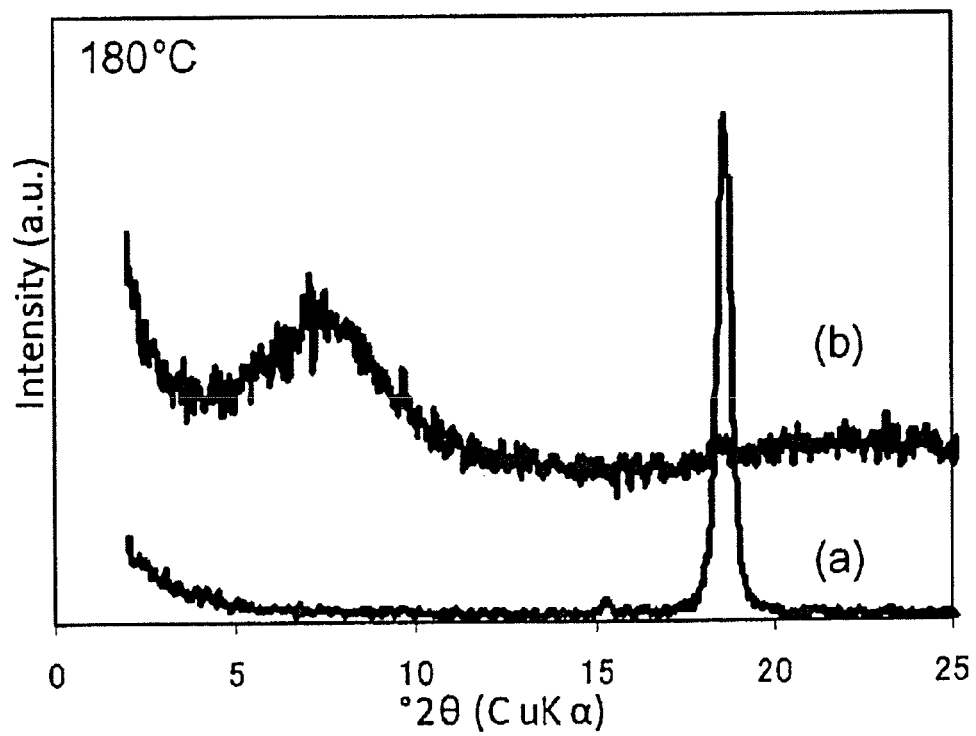
FIG. 5 is indicative of XRD patterns for brucite (a) and a brucite/D-sorbitol hybrid (b) (180° C. reaction).
Figure 6:
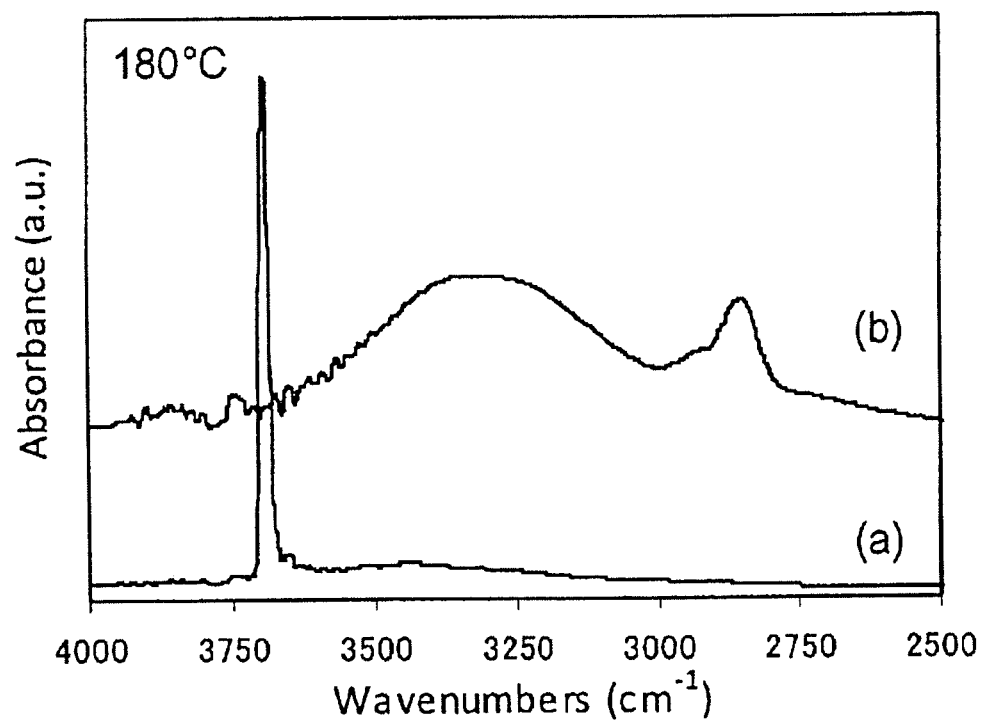
FIG. 6 is indicative of FT-IR spectra for brucite (a) and a brucite/D-sorbitol hybrid (b) (180° C. reaction).

As a result of X-ray diffractometry, the base-to-base distance (0.48 nm) of brucite was found to be extended to 1.2 nm after reaction with D-sorbitol (FIG. 5). In the FT-IR spectra, OH stretching vibration near 3,690 $cm^{-1}$ vanished off, and 2,900 $cm^{-1}$ and 2,840 $cm^{-1}$ CH stretching vibrations appeared after reaction with D-sorbitol. This has suggested that the brucite interlayer hydrogen bonds were cut, and D-sorbitol was intercalated instead (FIG. 6).

Example 2

Figure 7:
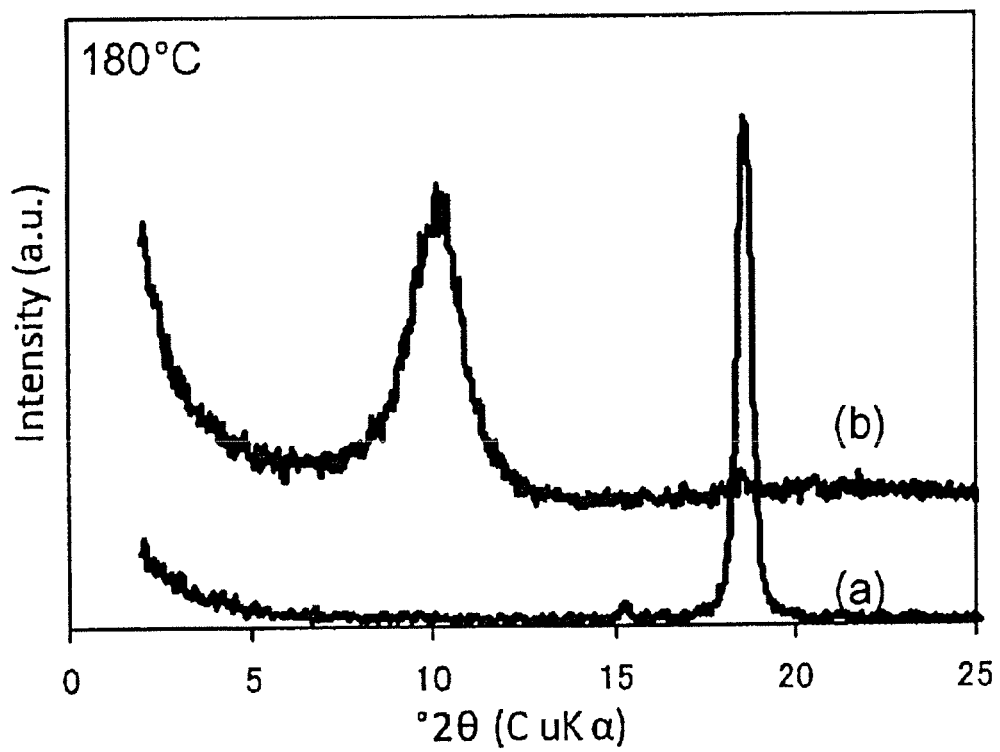
FIG. 7 is indicative of XRD patterns for brucite (a) and a brucite/xylitol hybrid (b) (180° C. reaction).
Figure 8:
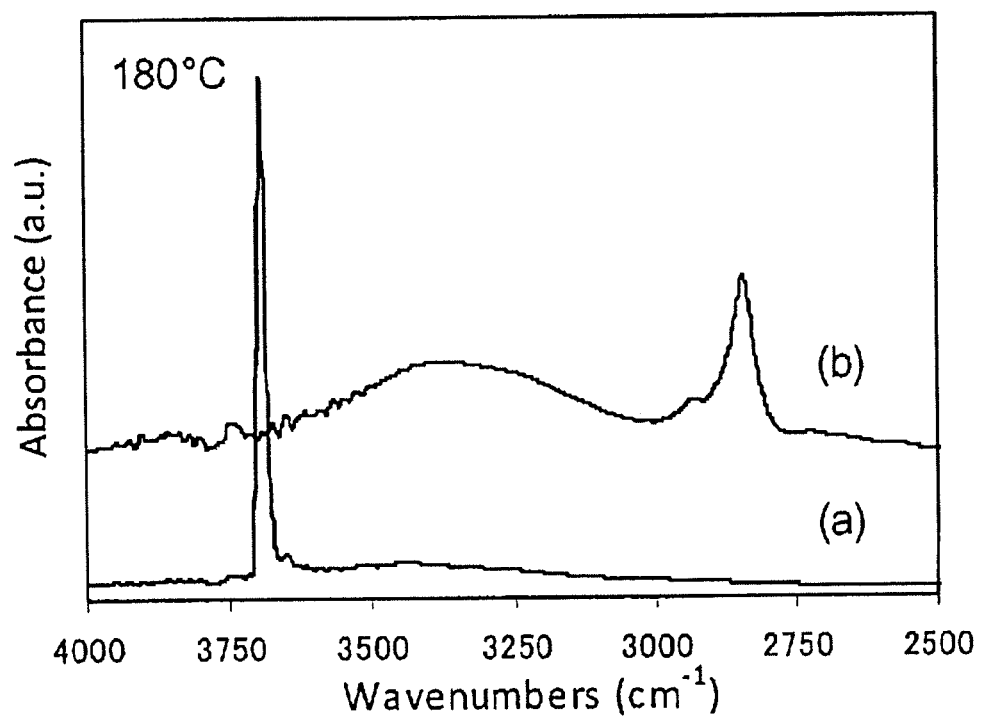
FIG. 8 is indicative of FT-IR spectra for brucite (a) and a brucite/xylitol hybrid (b) (180° C. reaction).

Experimentation was carried out much the same way as in Example 1 with the exception that xylitol was used as the sugar (made by Nakalai Tesque Inc.). The results of X-ray diffractometry are plotted in FIG. 7. The base-to-base distance (0.48 nm) of brucite was found to be extended to 0.9 nm after reaction with xylitol (FIG. 7). In the FT-IR spectra, OH stretching vibration near 3,690 cm$^{-1}$ vanished off, and 2,900 cm$^{-1}$ and 2,840 cm$^{-1}$ CH stretching vibrations appeared after reaction with xylitol, indicating that the intercalation of xylitol occurred (FIG. 8).

Example 3

Figure 9:
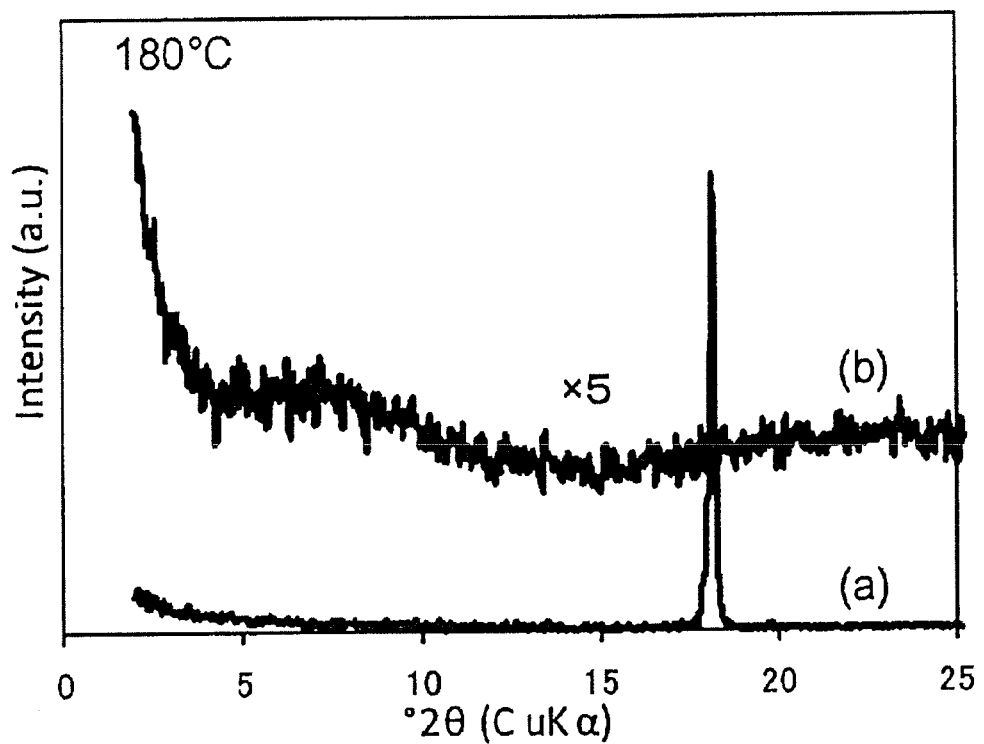
FIG. 9 is indicative of XRD patterns for portlandite (a) and a portlandite/D-sorbitol hybrid (b) (180° C. reaction).
Figure 10:
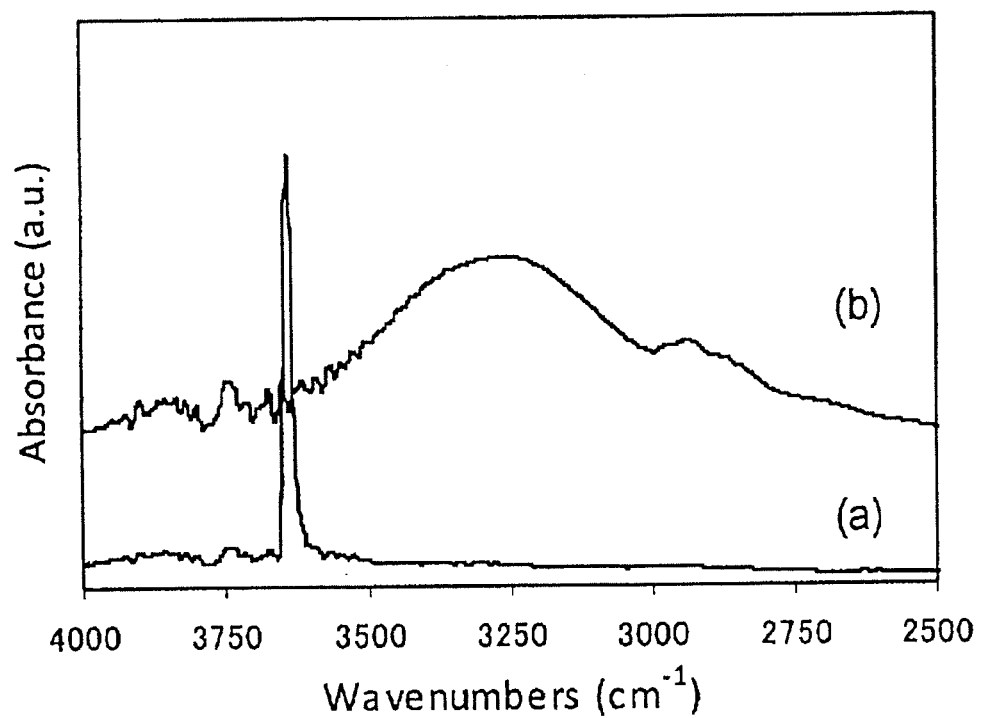
FIG. 10 is indicative of FT-IR spectra for portlandite (a) and a portlandite/D-sorbitol hybrid (b) (180° C. reaction).

Experimentation was carried out much the same way as in Example 1 with the exception that the hydroxide mineral used was changed to calcium hydroxide Ca(OH)$_2$ (made by Wako Pure Chemical Industries Ltd.) (portlandite). The results of X-ray diffractometry are plotted in FIG. 9. The portlandite base-to-base distance of 0.49 nm was found to be extended to 1.3 nm after reaction with D-sorbitol. In the FT-IR spectra, OH stretching vibration near 3,640 cm$^{-1}$ vanished off, and broad 2,900 cm$^{-1}$ and 2,840 cm$^{-1}$ CH stretching vibrations appeared after reaction with D-sorbitol, indicating that the intercalation of D-sorbitol occurred (FIG. 10).

Example 4

Figure 11:
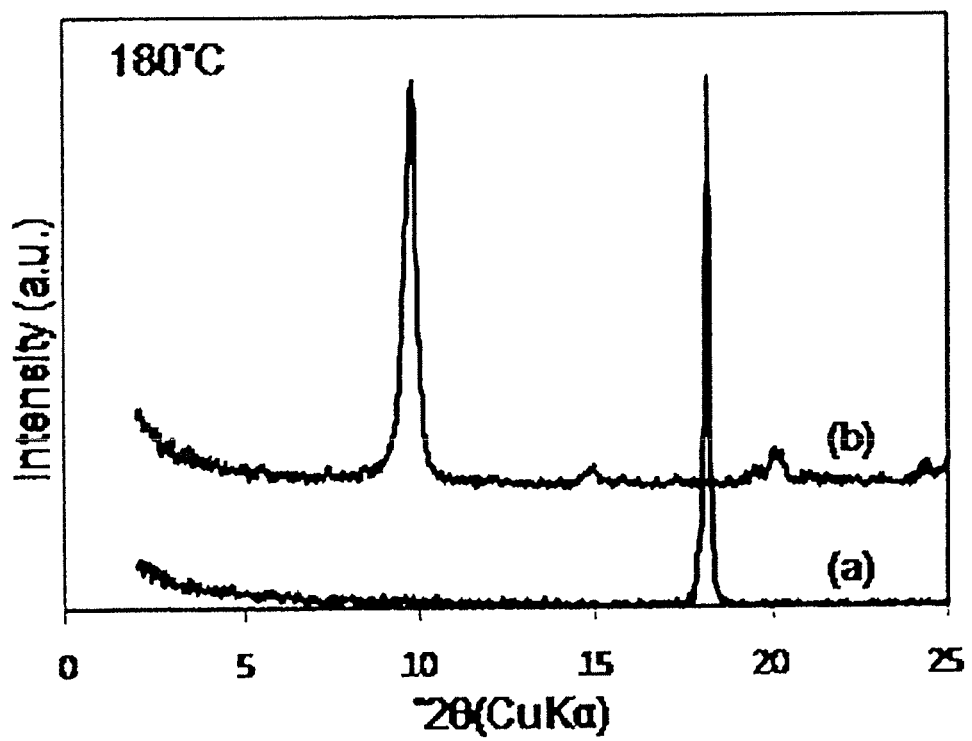
FIG. 11 is indicative of XRD patterns for portlandite (a) and a portlandite/erythritol hybrid (b) (180° C. reaction).
Figure 12:
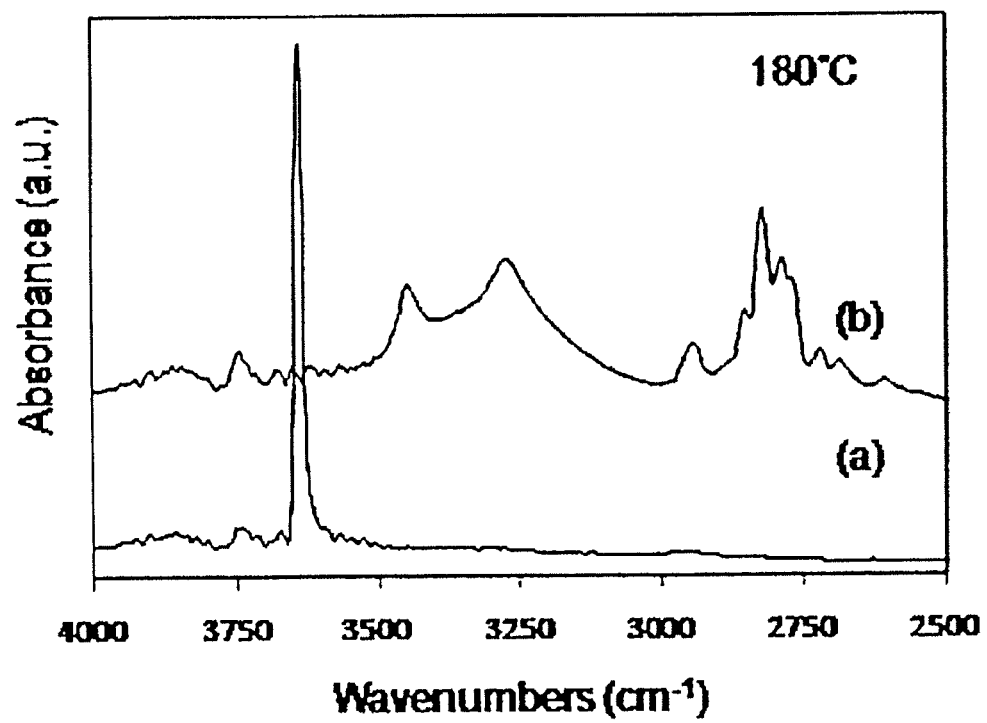
FIG. 12 is indicative of FT-IR spectra for portlandite (a) and a portlandite/erythritol hybrid (b) (180° C. reaction).

Experimentation was carried out much the same way as in Example 3 with the exception that the sugar alcohol used was changed to erythritol (made by Nakalai Tesque Inc.). The results of X-ray diffractometry are plotted in FIG. 11. The portlandite base-to-base distance of 0.49 nm was found to be extended to 0.9 nm. In the FT-IR spectra, OH stretching vibration near 3,640 cm$^{-1}$ vanished off, and 2,900 cm$^{-1}$ and 2,840 cm$^{-1}$ CH stretching vibrations appeared after reaction with erythritol, indicating that the intercalation of erythritol occurred (FIG. 12).

Example 5

Figure 13:
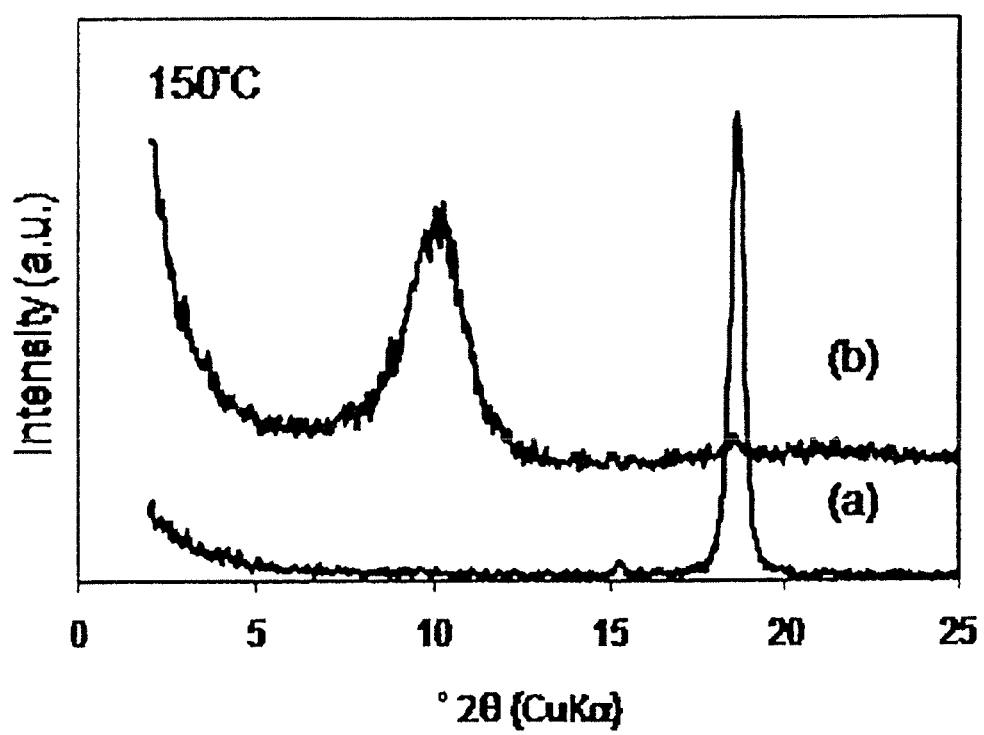
FIG. 13 is indicative of XRD patterns for brucite (a) and a brucite/D-sorbitol hybrid (b) (150° C. reaction).
Figure 14:
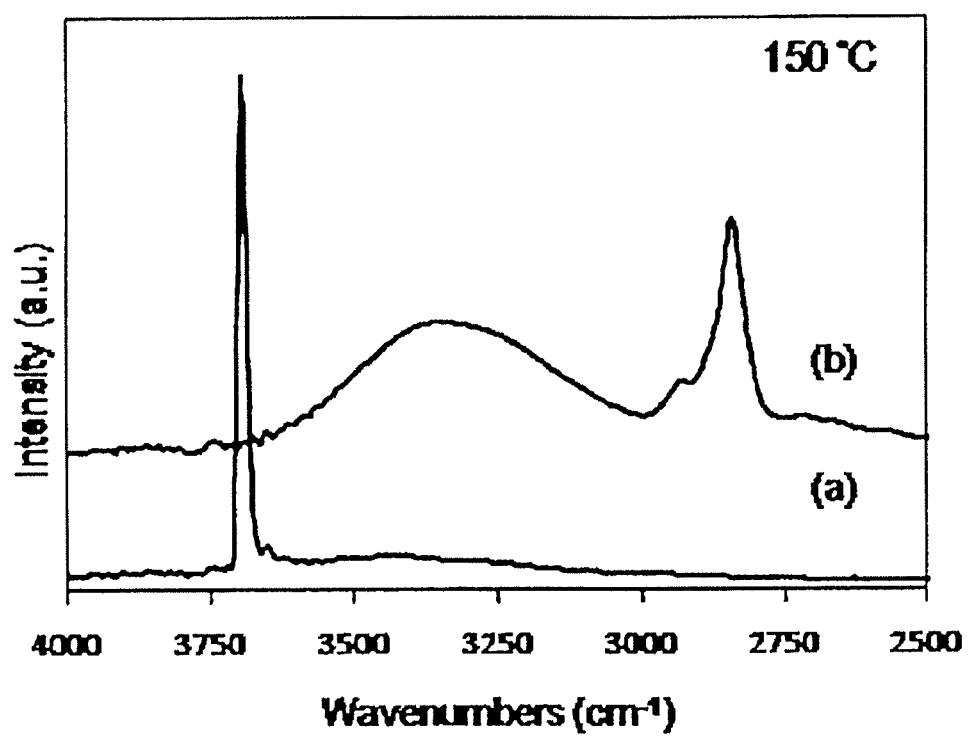
FIG. 14 is indicative of FT-IR spectra for brucite (a) and a brucite/D-sorbitol hybrid (b) (150° C. reaction).

Experimentation was carried out much the same way as in Example 2 with the exception that the mixing/melting conditions were changed to 150° C. and 72 hours. The brucite base-to-base distance of 0.48 nm was found to be extended to 0.9 nm after reaction with xylitol (FIG. 13). In the FT-IR spectra, OH stretching vibration near 3,690 cm$^{-1}$ vanished off, and 2,900 cm$^{-1}$ and 2,840 cm$^{-1}$ CH stretching vibrations appeared after reaction with xylitol, indicating that the intercalation of xylitol occurred (FIG. 14). This reveals that the brucite interlayer hydrogen bonds were cut with the intercalation of xylitol.

Comparative Example 1

Figure 15:
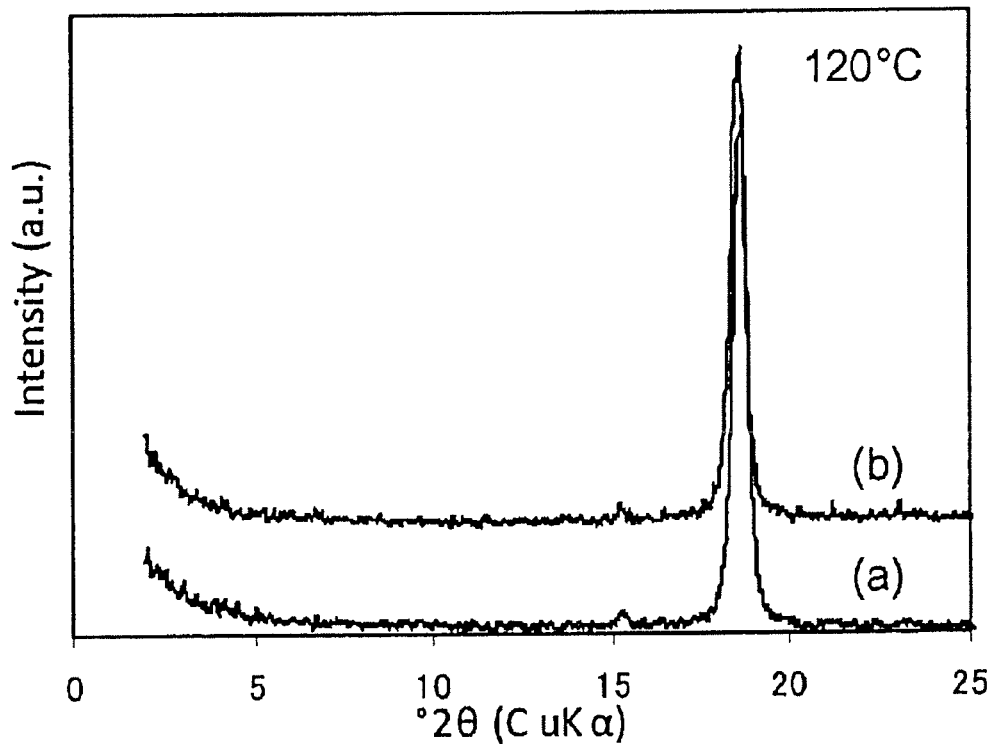
FIG. 15 is indicative of XRD patterns for brucite (a) and a brucite/D-sorbitol hybrid (b) (120° C. reaction).
Figure 16:
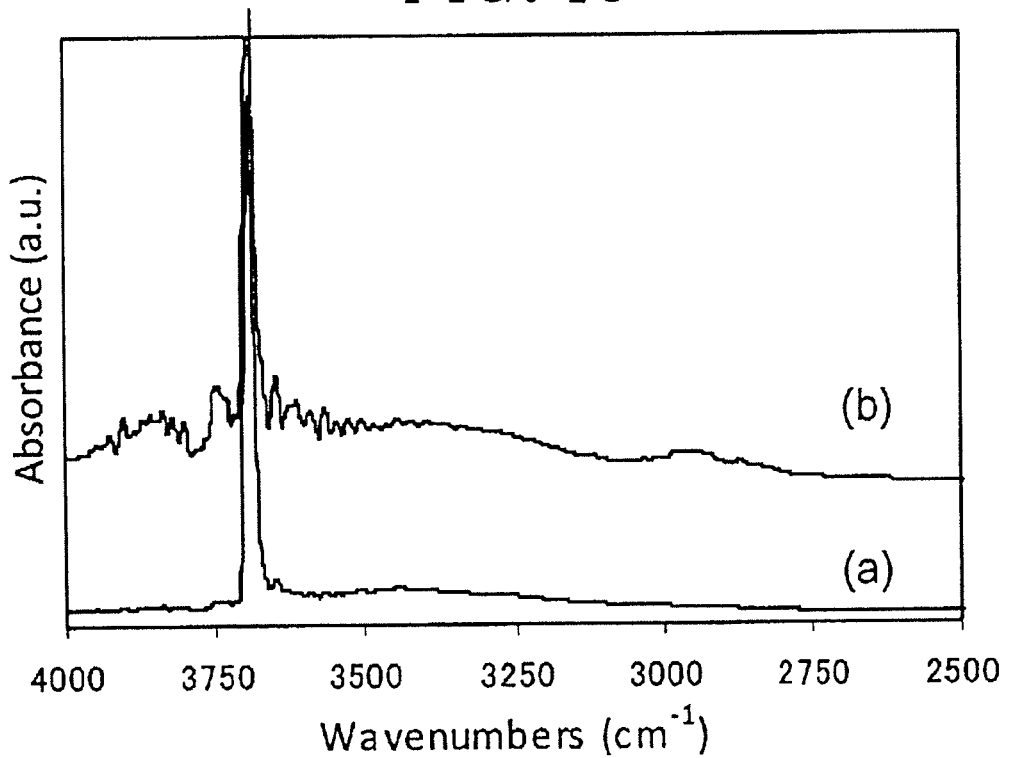
FIG. 16 is indicative of FT-IR spectra for brucite (a) and a brusite/D-sorbitol hybrid (b) (120° C. reaction).

Experimentation was carried out much the same way as in Example 1 with the exception that the mixing/melting conditions were changed to 120° C. and 24 hours. The brucite base-to-base distance of 0.48 nm was found to be invariable even after reaction with D-sorbitol (FIG. 15). In the FT-IR spectra, OH stretching vibration near 3,690 cm$^{-1}$ was observed even after reaction with D-sorbitol. Weak 2,900 cm$^{-1}$ and 2,840 cm$^{-1}$ CH stretching vibrations appeared (FIG. 16). This indicates that the brucite interlayer hydrogen bonds were not cut by reason of low melting temperature, and the intercalation of D-sorbitol did not occur either.

Comparative Example 2

Figure 17:
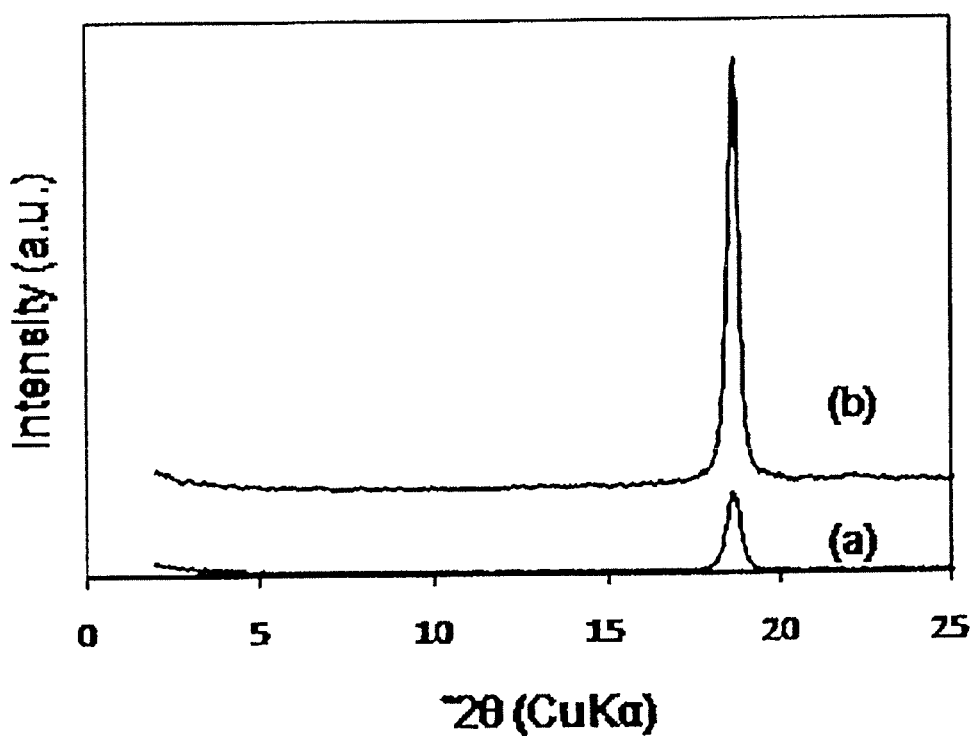
FIG. 17 is indicative of FT-IR spectra for brusite (a) and a brucite/D-sorbitol hybrid prepared with a water solvent (180° C. hydrothermal reaction for 24 hours).

Twenty (20) grams of D-sorbitol (made by Nakalai Tesque Inc.) were dissolved in 20 ml of distilled water with the addition of 0.3 gram of brucite (made by Rare Metallic Co., Ltd.), after which the aforesaid hydrothermal reactor was used to perform heating at 180° C. for 24 hours thereby preparing a sample. After washing and drying, the obtained sample was estimated as in the above examples. As a result, it was found that there was no change in the brucite interlayer base-to-base distance of 0.48 nm even after reaction with D-sorbitol (FIG. 17). In the FT-IR spectra, OH stretching vibration near 3,690 cm$^{-1}$ was observed even after reaction with D-sorbitol, with the spectral being much the same as in FIG. 16. This reveals that, with the solvent method, the brucite interlayer hydrogen bonds were not cut, and the intercalation of D-sorbitol did not occur either.

POSSIBLE APPLICATIONS TO THE INDUSTRY

The invention provides an organic/inorganic hybrid having high flame retardancy, flexibility, moldability and affinities for organic compounds, and a process of producing the same. The inventive organic/inorganic hybrid may be used in various fields, for instance, as purification adsorbents for water and waste oils, catalysts for petroleum cracking, agents form removal of sulfur oxides from thermal power plant emissions, counteragents for acidified rivers and soils, pharmaceutical raw materials, and flame retarders for plastics. In particular, the inventive hybrids are effective as flame retarders and DDS materials, and may have applications to the organic synthesis chemistry, pharmaceutics or like industries.

EXPLANATION OF THE REFERENCE NUMERALS

1: Organic/inorganic hybrid
11$a$, 11$b$, 11$c$, 11$d$: Inorganic compound unit layers
13: Organic compound (saccharides having 4 to 40 carbon atoms)
40: Hydroxide mineral
$t_1$, $t_3$: Base-to-base distance
$t_2$, $t_4$: Distance between the adjacent planes of the inorganic compound unit layers

What is claimed is:
1. An organic/inorganic hybrid, comprising a layered hydroxide mineral with sheet-like inorganic compound unit layers, and an organic compound included between said inorganic compound unit layers, wherein:
    each of said inorganic compound unit layers is electrically neutral and has hydroxyl groups on its surface,
    said hydroxide mineral is at least one hydroxide mineral selected from the group consisting of Mg(OH)$_2$, Ca(OH)$_2$, Al(OH)$_3$, AlO(OH), Fe(OH)$_3$ and FeO(OH),
    said organic compound is a saccharide having 4 to 40 carbon atoms, and
    said inorganic compound unit layers have no interlayer ions.
2. The organic/inorganic hybrid as recited in claim 1, wherein said hydroxide mineral is at least one hydroxide mineral selected from the group consisting of brucite, portlandite, gibbsite, boehmite, nordstrandite, doyleite, bialite, bernalite, and lepidocrocite.

3. The organic/inorganic hybrid as recited in claim 1, wherein hydrogen bonds between said hydroxyl groups between adjacent said inorganic compound unit layers are cut.

4. The organic/inorganic hybrid as recited in claim 3, wherein a part of the hydrogen bonds between said hydroxyl groups remains uncut.

5. The organic/inorganic hybrid as recited in claim 1, wherein each of said inorganic compound unit layers has octahedrons lined up through edge sharing in a sheet configuration, wherein each octahedron has $OH^-$ or $O^{2-}$ ions hexa-coordinating to any one metal ion of $Mg^{2+}$, $Ca^{2+}$, $Al^{3+}$ or $Fe^{3+}$.

6. The organic/inorganic hybrid as recited in claim 1, wherein said saccharide having 4 to 40 carbon atoms is at least one saccharide selected from the group consisting of a sugar alcohol, a sugar, and a derivative thereof.

7. The organic/inorganic hybrid as recited in claim 6, wherein said sugar alcohol is at least one sugar alcohol selected from the group consisting of erythritol, threitol, arabinitol, xylitol, ribitol, iditol, galactitol, sorbitol, mannitol, volemitol, perseitol, and D-erythro-D-galacto-octitol.

8. The organic/inorganic hybrid as recited in claim 6, wherein said sugar is at least one sugar selected from the group consisting of glucose, fructose, galactose, mannose, maltose, sucrose, lactose, fructo-oligosaccharide, galacto-oligosaccharide, raffinose, stachyose, starch, glycogen, cellulose, pectin, alginic acid, glucomannan, chitin, hyaluronic acid, chondoroitin, and agarose.

9. The organic/inorganic hybrid as recited in claim 1, wherein the hydroxyl groups on the surface of the unit layers have affinity with a sugar and/or sugar alcohol having 4 to 40 carbon atoms to form a stable inclusion compound.

10. A process of producing the organic/inorganic hybrid as recited in claim 1, comprising a step of mixing said hydroxide mineral with the saccharide having 4 to 40 carbon atoms to form a mixture, and a step of melting said mixture to cut hydrogen bonds between adjacent said inorganic compound unit layers.

11. The process of producing the organic/inorganic hybrid as recited in claim 10, wherein said mixture is molten in a temperature range that is below a thermal decomposition temperature of said saccharide having 4 to 40 carbon atoms and higher than 150° C.

* * * * *